3,099,654
NOVEL 9α-FLUORO-Δ¹-CORTICOSTEROIDS AND PREPARATION THEREOF
Robert Joly, Montmorency, Seine-et-Oise, Julien Warnant, Neuilly-sur-Seine, and Bernard Goffinet, Paris, France, assignors, by mesne assignments, to Roussel-UCLAF, S.A., Paris, France, a corporation of France
No Drawing. Filed July 10, 1961, Ser. No. 122,665
Claims priority, application France Aug. 17, 1960
16 Claims. (Cl. 260—239.55)

This invention relates to novel 16α-methyl-9α-fluoro-Δ¹-corticosterones having the formula

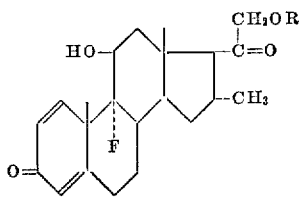

wherein R is selected from the group consisting of hydrogen, an acyl radical of a mineral acid and an acyl radical of an organic carboxylic acid having 1 to 18 carbon atoms. The invention further relates to a novel process for the preparation of the compounds of Formula I and novel intermediates thereof.

The compounds of Formula I possess a very pronounced anti-inflammatory activity and are useful for the treatment of acute and chronic rheumatic afflictions, radicular pain or sciatic lumbar pains. They are also useful for the treatment of local or generalized inflammatory reactions, infectious dermatitis, asthma, emphysema and fibrosis. They are also useful as intermediates for other steroid compounds.

In copending, commonly-assigned U.S. patent application Serial No. 124,248, filed May 3, 1961, the preparation of 16α-methyl-Δ¹-corticosterone is described. The said compound is an anti-inflammatory agent. The compounds of Formula I which are derived from 16α-methyl-Δ¹-corticosterone have a higher anti-inflammatory activity than the compounds of the said copending application.

It is an object of the invention to provide novel 16α-methyl-9α-fluoro-Δ¹-corticosterones of Formula I.

It is a further object of the invention to provide a novel process for the preparation of 16α-methyl-9α-fluoro-Δ¹-corticosterones of Formula I.

It is an additional object of the invention to provide novel intermediates for 16α-methyl-9α-fluoro-Δ¹-corticosterones of Formula I.

It is another object of the invention to provide novel anti-inflammatory compositions containing novel 16α-methyl-9α-fluoro-Δ¹-corticosterones of Formula I.

These and other objects and advantages of the invention will become obvious from the following detailed description.

The compounds of the invention have the formula

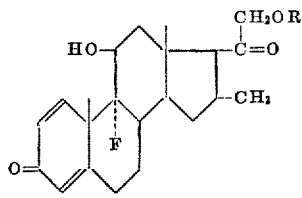

wherein R is selected from the group consisting of hydrogen, an acyl radical of a mineral acid and an acyl radical of an organic carboxylic acid having 1 to 18 carbon atoms.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cyclohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-tert-butyl-phenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-keto-alkanoic acids, such as acetylacetic acid, propionylacetic acid and butyrylacetic acid; amino acids such as diethylaminoacetic acid and aspartic acid. Examples of other suitable acids are sulfonic acids, phosphoric acid, hydrohalides and sulfuric acid.

The process for the preparation of compounds of Formula I according to the invention comprises dehydrating 21-acyloxy-16α-methyl-Δ¹-corticosterone wherein the acyl radical is the acyl radical of an organic carboxylic acid having 1 to 18 carbon atoms to form 21-acyloxy-16α-methyl-Δ¹,⁴,⁹⁽¹¹⁾-pregnatriene-3,20 - dione, simultaneously brominating and formylating the latter to form 21-acyloxy-9α-bromo-11β-formoxy-16α-methyl-Δ¹,⁴-pregnadiene-3,20-dione, reacting the latter under weakly alkaline conditions to form 9β,11β-epoxy-16α-methyl-Δ¹,⁴-pregnadiene-21-ol-3,20-dione, reacting the said product with an acylating agent to form 21-acyloxy-9β,11β-epoxy-16α-methyl-Δ¹,⁴-pregnadiene-3,20-dione, reacting the acylated product with hydrofluoric acid to form 21-acyloxy-9α-fluoro-16α-methyl-Δ¹,⁴-pregnadiene-11β-ol-3,20-dione which is saponified to give the free alcohol, 9α-fluoro-16α-methyl-Δ¹-corticosterone. To form the acid esters of 9α-fluoro-16α-methyl-Δ¹-corticosterone, the free alcohol is reacted with the corresponding acylating agents such as an acid anhydride or acid chloride in the presence of a tertiary base.

A preferred mode of the process of the invention comprises dehydrating 21-acetoxy-16α-methyl-Δ¹-corticosterone in the 9,11-position by the action of a sulfonyl halide such as methane sulfonyl chloride or p-toluene sulfonyl chloride in the presence of pyridine and an N,N-di-lower alkyl lower alkanoic acid amide such as dimethylformamide to form 21-acetoxy-16α-methyl-Δ¹,⁴,⁹⁽¹¹⁾-pregnatriene-3,20-dione, reacting the latter with N-bromo-succinimide in the presence of dimethylformamide and perchloric acid to form 21-acetoxy-9α-bromo-11β-formoxy-16α-methyl-Δ¹,⁴-pregnadiene-3,20-dione, reacting the said bromo product with a weakly alkaline base such as sodium bicarbonate in an inert aqueous organic solvent at reflux temperatures which simultaneously forms the epoxide and saponifies the 21-ester to form 9β,11β-epoxy-16α-methyl-Δ¹,⁴-pregnadiene-21-ol-3,20-dione, acylating the latter with acetic anhydride to form 21-acetoxy-9β,11β-epoxy-16α-methyl-Δ¹,⁴-pregnadiene-3,20-dione, reacting the said acylated product with hydrofluoric acid in an organic solvent such as dimethylformamide to form 21-acetoxy-9α-fluoro-16α-methyl-Δ¹,⁴-pregnadiene-11β-ol-3,20-dione, saponifying the latter with aqueous sodium bicarbonate in methanol to form 9α-fluoro-16α-methyl-Δ¹-corticosterone and recovering the latter. The process of the invention as illustrated in Table I.

TABLE I

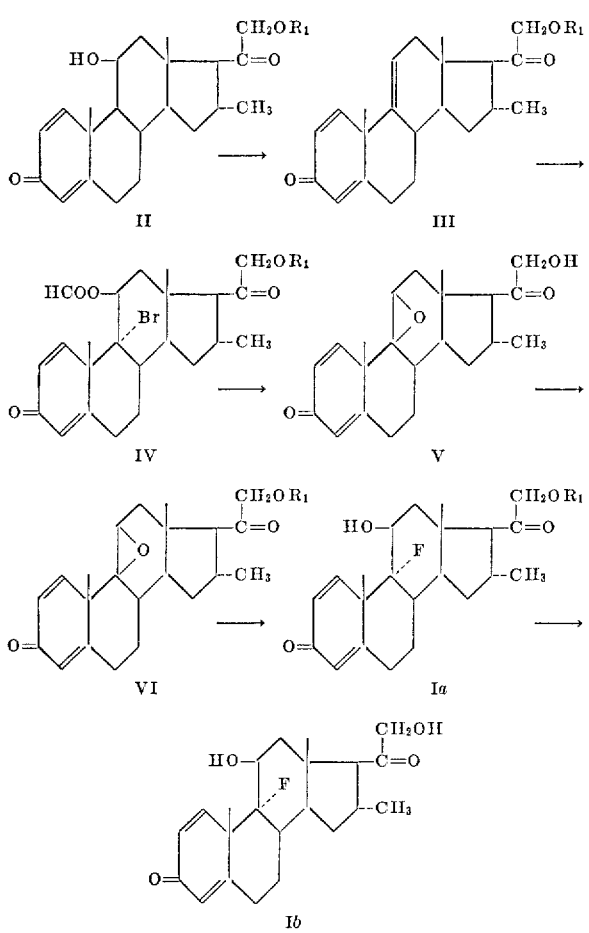

$R_1$ is an acyl radical of an organic carboxylic acid having 1 to 18 carbon atoms.

The 9α-fluoro-16α-methyl-$\Delta^{1,4}$-pregnadiene-11β,21-diol-3,20-dione and its esters are utilized preferably by oral method, by transcutaneous method in the form of intramuscular, intra- or periarticular injections, or by a local infiltration, and by rectal method.

They can be made in the form of solutions, injectable suspensions prepared with adequate excipients to the principal ingredients and prepared in ampoules, multiple dose flacons, in the form of implants, of tablets, of suppositories, of pomades and of creams, and in the form of ophthalmic drops, nasal drops or auricularal drops. The daily dose for an adult is 5 to 30 mg. daily depending on the method of administration.

In the following example there are described several preferred embodiments to illustrate the invention. However, it is to be understood that the invention is not intended to be limited to the specific embodiments.

EXAMPLE

*Preparation of 16α-Methyl-9α-Fluoro-$\Delta^1$-Corticosterone*

STEP A.—PREPARATION OF 21-ACETOXY-16α-METHYL-$\Delta^{1,4,9(11)}$-PREGNATRIENE-3,20-DIONE (III)

2 gm. of 21-acetoxy-16α-methyl-$\Delta^{1,4}$-pregnadiene-11β-ol-3,20-dione (II) were dissolved in a mixture of 6 cc. of dimethylformamide and 2.4 cc. of pyridine. 1.2 cc. of methane sulfonyl chloride were added over a period of thirty minutes to this reaction mixture under agitation in an atmosphere of nitrogen at a temperature of +20° C. The reaction mixture was allowed to stand for a period of two hours at 20° C., then it was poured into 100 cc. of a mixture of water and ice.

The gummy residue was vacuum filtered, washed with water until the wash waters were neutral, and dried. 1.09 gm. of 21-acetoxy-16α-methyl-$\Delta^{1,4,9(11)}$-pregnatriene-3,20-dione were obtained.

The raw product was dissolved in alcohol, treated with carbon black, filtered, and the filtrate washed with alcohol. The organic phases were combined and iced for a period of about one hour. The crystals obtained were vacuum filtered, washed with alcohol and dried. Recrystallization was performed from aqueous acetone. The 21-acetoxy-16 -methyl $\Delta^{1,4,9(11)}$-pregnatriene-3,20-dione (III) had a melting point of 162° C. and a specific rotation $[\alpha]_D^{20} = +76.5°$ (c.=0.5% in acetone).

*Analysis.*—$C_{24}H_{30}O_4$; molecular weight=382.48. Calculated: C, 75.36%; H, 7.9%. Found: C, 75.5%; H, 7.9%.

This compound is not described in the literature.

The starting compound was prepared according to the process described in United States patent application Serial No. 124,248, filed May 3, 1961, by reacting 16α-methyl-5β-pregnane-3α-ol-11,20-dione with bromine in the presence of an enolization agent to form 21-bromo-16α-methyl-5β-pregnane-3α-ol-11,20-dione, reacting the latter with an alkali metal acetate to form the corresponding 21-acetoxy compound, oxidizing the latter to 21-acetoxy-16α-methyl-5β-pregnane-3,11,20-trione, brominating and dehydrobrominating the latter to form 21-acetoxy-16α-methyl-$\Delta^{1,4}$-pregnadiene-3,11,20-trione, forming the corresponding 3,20-disemicarbazone, reducing the 11-ketone grouping and hydrolyzing the latter to 21-acetoxy-16α-methyl-$\Delta^{1,4}$-pregnadiene-11β-ol-3,20-dione.

STEP B.—PREPARATION OF 21-ACETOXY-9α-BROMO-11β-FORMOXY-16α-METHYL-$\Delta^{1,4}$-PREGNADIENE-3,20-DIONE (IV)

2.5 gm. of 21-acetoxy-16α-methyl-$\Delta^{1,4,9(11)}$-pregnatriene-3,20-dione (III) were dissolved at 20–25° C. in the absence of light in 25 cc. of dimethylformamide. Then in one single amount 1.395 gm. of N-bromo-succinimide were added under agitation and while bubbling nitrogen therethrough at 20–25° C. A solution of 1.395 cc. of perchloric acid and 3.487 cc. of water was added to the above solution over a period of about five minutes.

A precipitate of 21-acetoxy-9α-bromo-11β-formoxy-16α-methyl-$\Delta^{1,4}$-pregnadiene-3,30-dione was formed. The suspension was agitated then for about two hours and thirty minutes, poured into a mixture of 250 cc. of water and ice and agitated for an hour. The precipitate was vacuum filtered, washed with water until the wash waters were neutral, and dried. 3.15 gm. of 21-acetoxy-9α-bromo-11β-formoxy-16α-methyl-$\Delta^{1,4}$ - pregnadiene - 3,20-dione (IV) were obtained, having a melting point of 160° C. Analysis showed 16.1 % of bromine (theoretical 15.75%). The product was insoluble in water.

The product is not described in the literature.

It was used in the following step of the synthesis without further purification.

STEP C.—PREPARATION OF 9β,11β-EPOXY-16α-METHYL-$\Delta^{1,4}$-PREGNADIENE-21-OL-3,20-DIONE (V)

3 gm. of 21-acetoxy-9α-bromo-11β-formoxy-16α-methyl-$\Delta^{1,4}$-pregnadiene-3,20-dione (IV) were placed in suspension at 20° C. in 30 cc. of methanol. The suspension was agitated and nitrogen was introduced for a period of about five minutes. Then a solution of 3 gm. of sodium bicarbonate in 30 cc. of water was added. The suspension was heated to reflux under nitrogen and under agitation for a period of about twenty minutes and solution was observed. The reaction mixture was allowed to stand for a period of about forty-five minutes under these conditions, then cooled to +10° C. and 15 cc. of a 10% aqueous acetic acid solution were added in order to bring the pH to 5.5–6. Then 45 cc. of water were added and the mixture was cooled for a period of one hour at −5° C. The crystal residue was vacuum filtered, washed with water, and dried at 40° C. 1.68 gm. of 9β,11β-epoxy- 16α-methyl-Δ$^{1,4}$-pregnadiene-21-ol-3,20-dione (V) were obtained having a melting point of 176–178° C. This product was insoluble in water.

This compound is not described in the literature.

STEP D.—PREPARATION OF 21-ACETOXY-9β,11β-EPOXY-16α-METHYL-Δ$^{1,4}$-PREGNADIENE-3,20-DIONE (VI)

1.68 gm. of 9β,11β-epoxy-16α-methyl-Δ$^{1,4}$-pregnadiene-21-ol-3,20-dione (V) were dissolved in 6.72 cc. of pyridine. 3.36 cc. of acetic anhydride were then added under agitation and under nitrogen at 25° C. The reaction mixture was maintained for a period of about three hours under agitation and under nitrogen at 30° C. The reaction mixture was poured into 100 cc. of a mixture of water and ice and the aqueous mixture agitated for a period of one hour and then vacuum filtered. The precipitate was washed with water until the wash waters were neutral and then dried. The raw product was purified by dissolution at elevated temperatures in aqueous dimethylformamide, treatment with carbon black and crystallization in the cold.

1.55 gm. of 21-acetoxy-9β,11β-epoxy-16α-methyl-Δ$^{1,4}$-pregnadiene-3,20-dione (VI) were obtained having a melting point of 177–178° C. and a specific rotation $[\alpha]_D^{20} = +79°$ C.±3° C. (c.=0.5% in chloroform).

The product was soluble in alcohol, acetone, benzene, chloroform, methanol, ethyl acetate and dimethylformamide, insoluble in water and ether.

Analysis.—$C_{24}H_{30}O_5$; molecular weight=398.48. Calculated: C, 72.33%; H, 7.59%; O, 20.07%. Found: C, 72.1%; H, 7.9%; O, 20.0%.

This compound is not described in the literature.

STEP E.—PREPARATION OF 21-ACETOXY-9α-FLUORO-16α-METHYL-Δ$^{1,4}$-PREGNADIENE-11β-OL-3,20-DIONE (Ib)

1.223 gm. of 21-acetoxy-9β,11β-epoxy-16α-methyl-Δ$^{1,4}$-pregnadiene-3,20-dione (VI) were introduced into 12.23 cc. of a mixture of dimethylformamide and hydrofluoric acid (ratio 3:4), cooled to $-30° \pm 2°$ C. Dissolution was complete in about fifteen minutes. The temperature was then allowed to rise to 0 to +5° C. and the reaction mixture was maintained under these conditions for a period of about two hours.

The solution was poured into a mixture of 61 cc. of ammonia solution and 183 gm. of ice. The mixture was allowed to stand for two hours at 20° C., then the precipitate formed was vacuum filtered, washed with water until the wash waters were neutral, and dried.

The raw product was purified by dissolution at elevated temperatures in alcohol, treatment with carbon black and crystallization in the cold. It can be recrystallized in alcohol. 938 mg. of 21-acetoxy-9α-fluoro-16α-methyl-Δ$^{1,4}$-pregnadiene-11β-ol-3,20-dione (Ib) were obtained, having a melting point of 254° C. and a specific rotation $[\alpha]_D^{20} = +123° \pm 2°$ (c.=0.5% in chloroform).

The product was soluble in chloroform, soluble in hot acetone, slightly soluble in benzene, insoluble in water, dilute aqueous alkalis and acids and in ether.

Analysis.—$C_{24}H_{31}O_5F$; molecular weight=418.49. Calculated: C, 68.87%; H, 7.46%; F, 4.54%. Found: C, 68.6%; H, 7.4%; F, 4.5%. Ultraviolet spectra=$\lambda_{max}$. ethanol 239 mμ, ε=15,100.

This compound is not described in the literature.

STEP F.—PREPARATION OF 16α-METHYL-9α-FLUORO-Δ$^1$-CORTICOSTERONE (Ia)

100 mg. of 21-acetoxy-9α-fluoro-16α-methyl-Δ$^{1,4}$-pregnadiene-11β-ol-3,20-dione (Ia) were suspended in a solution of 2.5 cc. of methanol, 50 mg. of sodium bicarbonate and 1.15 cc. of water. Nitrogen was allowed to bubble through the suspension at 20° C. for a period of fifteen minutes. Then the suspension was raised to reflux under nitrogen for a period of about forty-five minutes. The solution obtained was cooled at 20° C. and the pH value was adjusted to 5.5 by the addition of a 25% aqueous acetic acid solution. The methanol was distilled and an oily suspension was obtained. The suspension was cooled for one hour at about 0° C. The crystals obtained were vacuum filtered, washed with water, and dried.

The raw product was obtained with a yield of the order of 90% and was recrystallized from ethyl acetate. 16α-methyl-9α-fluoro-Δ$^1$-corticosterone (Ia) was obtained having a melting point of 217° C., percent fluorine=5.0% (theoretical: 5.04%). It was soluble in alcohol, acetone and chloroform, soluble in hot ethyl acetate, slightly soluble in ether and benzene, insoluble in water and dilute aqueous acids and alkalis.

This compound is not described in the literature.

*Pharmacodynamic Study of 21-Acetoxy-9α-Fluoro-16α-Methyl-Δ$^{1,4}$-Pregnadiene-11β-Ol-3,20-Dione*

DETERMINATION OF ANTI-INFLAMMATORY ACTIVITY

The technique employed was a modification of the "cotton granuloma test" described by Singer (Proc. Soc. Exp. Biol. Med. 92, 23, 1956) by operating on a nonsurrenal ectomized rat, as was made by Arth (J.A.C.S. 80, 3161, 1958). In the ventral region, under the pelt of preferably female rats two pellets of cotton of 10 mg. each were implanted. Once in the morning and once in the evening, 21-acetoxy-9α-fluoro-16α-methyl-Δ$^{1,4}$-pregnadiene-11β-ol-3,20-dione was administered orally in aqueous suspension for a period of two days. The third day the animals were sacrificed, sixteen hours after the last administration.

The pellets in association with the granuloma tissue were then cut out and weighed after desiccation in the oven. The initial weight of cotton was subtracted to obtain the net weight of granuloma. This was expressed in percent of weight of granuloma in the control animals. The coefficients of activity were determined by graphic analysis of the activity curve=$f$ (log dosage).

The $DI_{50}$, which is the 50% inhibitory dose for the formation of granuloma, was determined.

RESULTS

By oral method, 21-acetoxy-9α-fluoro-16α-methyl-Δ$^{1,4}$-pregnadiene-11β-ol-3,20-dione had an action 2.4 times superior to that of prednisolone acetate.

The 50% inhibitory dose ($DI_{50}$) was of the order of 1.25 mg. per kg.

TESTS OF ACUTE TOXICITY

The tests were made on mice of the Rockland strain weighing between 18 and 22 gm. The product was used in an aqueous suspension in the concentration of 10 mg. per cc.

This suspension was injected subcutaneously in doses of 50 and 100 mg. per kg. in groups of ten mice per dose. The duration of observation after injection was one week. No sign of intoxication was observed in the several hours which followed the injection. There was noted on the sixth day after injection one death among the mice having received 100 mg. per kg. The compound is thus devoid of toxicity in the dosage of 50 mg. per kg. and the only death occurring tardily with a dose of 100 mg. per kg. could not be attributed with certainty to the product being administered.

Various modifications of the process of the invention may be made without departing from the spirit or scope thereof, and it is to be understood that the invention be limited only as described in the appended claims.

We claim:

1. A compound having the formula

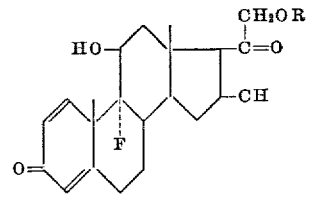

wherein R is selected from the group consisting of hydrogen, an acyl radical of a mineral acid and an acyl radical of an organic carboxylic acid having 1 to 18 carbon atoms.

2. 16α-methyl-9α-fluoro-Δ¹-corticosterone.

3. 21 - acetoxy - 9α - fluoro - 16α - methyl - Δ¹,⁴ - pregnadiene-11β-ol-3,20-dione.

4. A compound having the formula

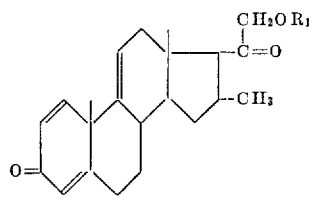

wherein $R_1$ is an acyl radical of an organic carboxylic acid having 1 to 18 carbon atoms.

5. 21 - acetoxy - 16α - methyl - Δ$^{1,4,9(11)}$ - pregnatriene-3,20-dione.

6. A compound having the formula

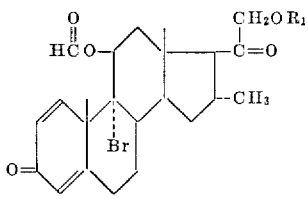

wherein $R_1$ is an acyl radical of an organic carboxylic acid having 1 to 18 carbon atoms.

7. 21 - acetoxy - 9α - bromo - 11β - formoxy - 16α-methyl-Δ¹,⁴-pregnadiene-3,20-dione.

8. 9β,11β - epoxy - 16α - methyl - Δ¹,⁴ - pregnadiene-21-ol-3,20-dione.

9. A compound having the formula

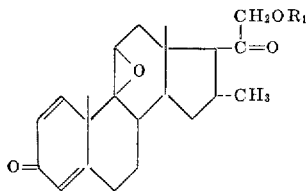

wherein $R_1$ is an acyl radical of an organic carboxylic acid having 1 to 18 carbon atoms.

10. 21 - acetoxy - 9β,11β - epoxy - 16α - methyl - Δ¹,⁴-pregnadiene-3,20-dione.

11. A process for the preparation of a compound having the formula.

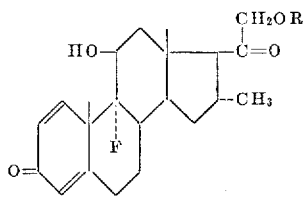

wherein R is selected from the group consisting of hydrogen, an acyl radical of a mineral acid and an acyl radical of an organic carboxylic acid having 1 to 18 carbon atoms, which comprises dehydrating 21-acyloxy-16α-methyl-Δ¹-corticosterone wherein the acyl radical is an acyl radical of an organic carboxylic acid having 1 to 18 carbon atoms to form 21-acyloxy-16α-methyl-Δ$^{1,4,9(11)}$-pregnatriene-3,20-dione, simultaneously brominating and formylating the latter with N-bromosuccinimide in the presence of dimethylformamide and perchloric acid to form 21-acyloxy-9α-bromo-11β-formoxy-16α-methyl-Δ¹,⁴-pregnadiene-3,20-dione, reacting said brominated product under weakly alkaline conditions to form 9β,11β-epoxy-16α - methyl-Δ¹,⁴-pregnadiene-21-ol-3,20-dione, acylating the latter to form 21-acyloxy-9β,11β-epoxy-16α-methyl-Δ¹,⁴-pregnadiene-3,20-dione, reacting the acylated product with hydrofluoric acid to form 21-acyloxy-9α-fluoro-16α-methyl-Δ¹,⁴-pregnadiene-11β-ol-3,20-dione and recovering a compound of the above formula.

12. The process of claim 11 wherein the dehydration is effected with a sulfonyl halide selected from the group consisting of alkyl sulfonyl halides and aryl sulfonyl halides in the presence of pyridine and dimethylformamide.

13. The process of claim 11 wherein the weak alkali is sodium bicarbonate.

14. The process of claim 11 wherein the acylation is effected with acetic anhydride.

15. The process of claim 11 wherein the hydrofluoric acid is in dimethylformamide.

16. A process for the preparation of 9α-fluoro-16α-methyl-Δ¹-corticosterone which comprises reacting 21-acetoxy-16α-methyl-Δ¹-corticosterone with methane sulfonyl chloride in the presence of pyridine and dimethylformamide to form 21-acetoxy-16α-methyl-Δ$^{1,4,9(11)}$-pregnatriene-3,20-dione, reacting the latter with N-bromo-succinimide in the presence of dimethylformamide and perchloric acid to form 21-acetoxy-9α-bromo-11β-formoxy-16α-methyl-Δ¹,⁴-pregnadiene-3,20-dione, reacting the said brominated product with sodium bicarbonate in an aqueous organic solvent to form 9β,11β-epoxy-16α-methyl-Δ¹,⁴-pregnadiene-21-ol-3,20-dione, reacting the latter with acetic anhydride to form 21-acetoxy-9β,11β-epoxy-16α-methyl-Δ¹,⁴-pregnadiene-3,20-dione, reacting the acetoxylated product with hydrofluoric acid in dimethylformamide to form 21-acetoxy-9α-fluoro-16α-methyl-Δ¹,⁴-pregnadiene-11β-ol-3,20-dione, reacting the said fluoro product with aqueous sodium bicarbonate in methanol to form 9α-fluoro-16α-methyl-Δ¹-corticosterone and recover the latter.

No references cited.

UNITED STATES PATENT OFFICE

CERTIFICATE OF CORRECTION

Patent No. 3,099,654

July 30, 1963

Robert Joly et al.

It is hereby certified that error appears in the above numbered patent requiring correction and that the said Letters Patent should read as corrected below.

Column 4, line 11, for "-16 -methyl" read -- 16α-methyl --; column 6, lines 67 to 75, for the upper right-hand portion of the formula reading --CH     read     --CH$_3$ Signed and sealed this 25th day of February 1964.

(SEAL)
Attest:

ERNEST W. SWIDER

Attesting Officer

EDWIN L. REYNOLDS
Acting Commissioner of Patents